UNITED STATES PATENT OFFICE.

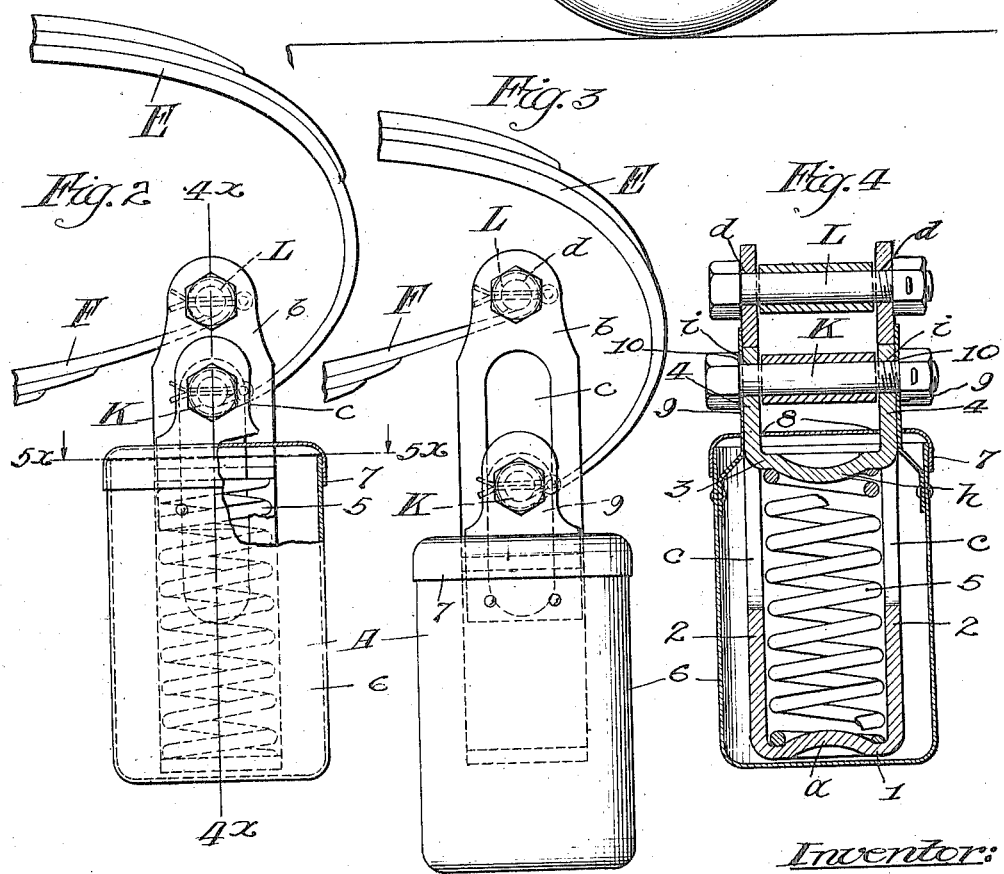

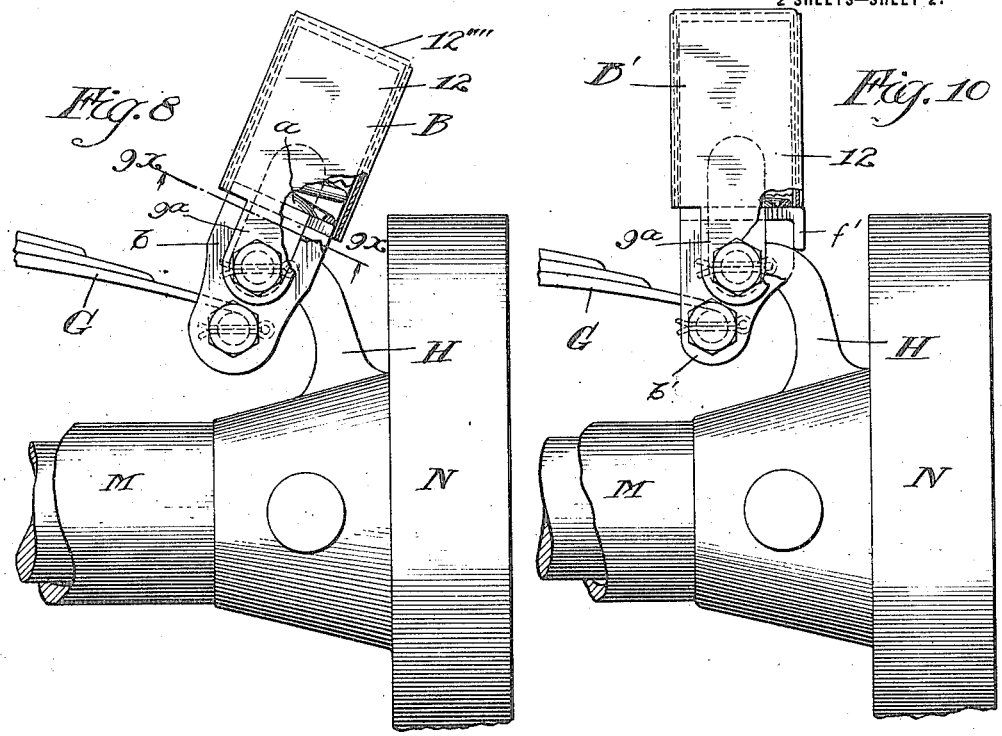
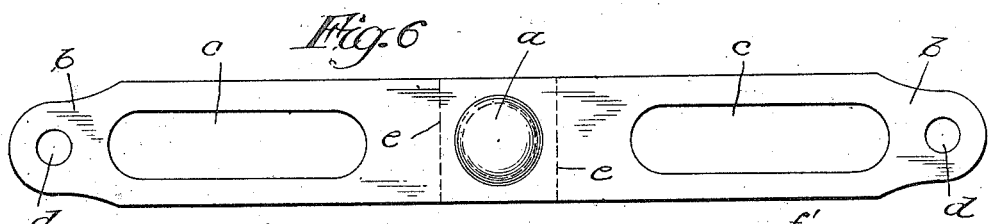
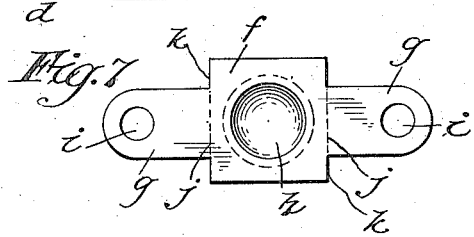
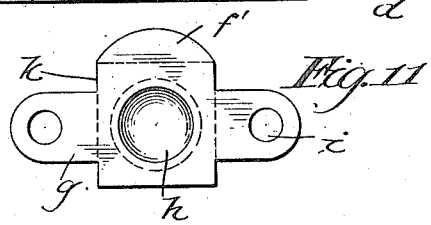
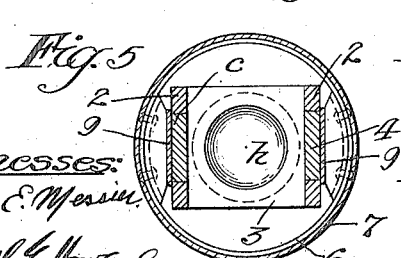
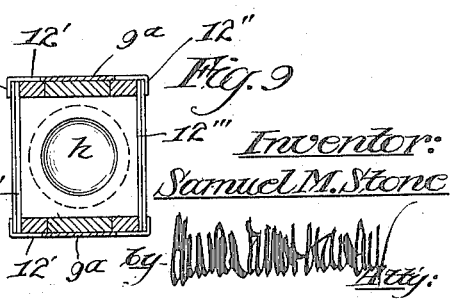

SAMUEL M. STONE, OF CHICAGO, ILLINOIS.

SHOCK-ABSORBER.

1,249,549.  Specification of Letters Patent.  Patented Dec. 11, 1917.

Application filed November 30, 1914. Serial No. 874,724.

*To all whom it may concern:*

Be it known that I, SAMUEL M. STONE, a citizen of the United States, and a resident of Chicago, Cook county, Illinois, have invented certain new and useful Improvements in Shock-Absorbers, of which the following is a specification.

My invention relates to spring mountings for vehicles, and has special reference to improvements in elastic spring shackles, commonly called "shock absorbers" for automobiles.

The object of my invention is to provide a shock absorber of very simple construction and low cost; and which, when substituted for the usual inelastic shackles of automobile springs, will greatly increase the effectiveness of the springs and lessen the spring shocks between the running gear and the body of the automobile.

Other objects of my invention are, to provide a shock absorber which shall contain but a single spiral spring and yet be exactly balanced; to reduce the number of parts in shock absorbers; to provide a device which may be quickly and easily applied without machine work of any kind, and in the installation of which the ordinary spring shackle bolts may be utilized. Still further objects of my invention will appear hereinafter.

My invention consists in an elastic spring shackle or shock absorber of the construction and combination of parts hereinafter described and particularly pointed out in the appended claims.

The invention will be more readily understood by reference to the accompanying drawing, forming a part of this specification, and in which:

Figure 1 is a partial side elevation of an automobile equipped with a shock absorber embodying my invention;

Fig. 2 is an enlarged side elevation of the shock absorber shown in normal position;

Fig. 3 is a similar view showing the shock absorber extended to its elastic limit;

Fig. 4 is a central vertical section of the shock absorber on the line $4^x$—$4^x$ of Fig. 2;

Fig. 5 is a horizontal section on the line $5^x$—$5^x$ of Fig. 2;

Fig. 6 depicts the external yoke of the device, before it is bent to U-form;

Fig. 7 depicts the internal yoke or spring follower, before it is bent to U-form;

Fig. 8 illustrates a modified form and application of my invention;

Fig. 9 is a sectional view on the line $9^x$—$9^x$ of Fig. 8;

Fig. 10 illustrates still another form of my invention; and

Fig. 11 depicts the spring follower of Fig. 10, before it is finally shaped.

As illustrated in the drawings, my novel shock absorber comprises only four parts, namely, an external yoke, an internal yoke, a compression spring, and a casing. As here disclosed, the device may be made in various proportions and shapes to suit the different automobile springs. Whatever its form, it takes the place of the rigid, pivotal, spring shackle commonly used in joining the opposed members of elliptical springs; and in the case of platform and like springs, to join them to the frame of the running gear. Thus, as in the case of the automobile shown in Fig. 1, the members, E, and, F, of the elliptical spring are shackled by the shock absorber, A; whereas in the case of an automobile having springs overlying the axles, as in Figs. 8 and 10, the spring, G, is shackled to the frame bracket, H, on the running gear, by a shock absorber, B, or B'. In substituting my shock absorber for the ordinary rigid or inelastic shackles I make use of the existing shackle bolts. To distinguish them from the coiled spring of my device, the automobile springs (E, F and G) are hereinafter called main springs.

The internal and external yokes are best made from flat rolled metal stock, and in their initial shapes they are stampings of the simple forms shown in Figs. 6, 7, and 11. The yokes are preferably made from stock of the same thickness so that their faces will be flush when assembled.

As shown in Fig. 6, the stamping from which the external yoke is made comprises a flat bar having a struck-up spring retainer or boss, $a$, at its middle and provided with suitably shaped ends, $b$. The intermediate portions contain the slots, $c$, $c$, and the ends, $b$, contain shackle bolt holes, $d$. The yoke is completed by bending the bar or stamping upon the dotted lines, $e$, $e$. When so formed it presents the appearance depicted in Figs. 2 to 5, in which state the external yoke comprises a bottom, 1, containing the boss, $a$, and the two parallel arms or sides, 2, 2, of equal length. Obviously the slots, c, c, are directly opposed; this is true also of the holes, d, in the upper ends of the yoke.

The stamping from which the internal yoke is made is shown in Fig. 7. It comprises a middle portion, f, and ends, g, g. The middle portion, f, contains a central downstruck spring retaining boss, h. It is of the same width as the bar from which the external yoke is formed. The length of the portion, f, is slightly less than the distance between the inner sides of the parallel arms, 2, 2, of the external yoke. The ends, g, g, are of a width slightly less than the width of the slots, c, c, in the external yoke, being intended to fit snugly and yet slide therein. Shackle bolt holes, i, i, are provided in the ends, g. The internal yoke is completed by bending the stamping on the dotted lines, j, j. When completed the internal yoke presents the bottom, 3, and the parallel arms or sides, 4, 4, as best shown in Fig. 4. The arms, 4, occupy the slots, c, c, of the longer yoke. They are shorter than said slots; and therefore, though confined against lateral movement in the external yoke, the internal yoke is permitted to move freely in a longitudinal direction. It should be noted that the shoulders, k, between the portions, f, and, g, and marking the ends of the bottom, 3, serve as side stops.

The coiled spring, 5, is interposed between the yoke bottoms, 1 and 3. It substantially fills the space between the sides of the external yoke and is securely centered and held by the bosses, a and h. In assembling the parts, I place the spring, 5, in the larger yoke and then force the smaller yoke downward thereon, between the arms of the larger yoke, until the arms of the smaller yoke snap into the guides or slots, c, c. That action completes the shock absorber proper, for it is then in condition to receive the shackle bolts, K and L, of the main springs. Fig. 4 shows the bolts in place in the holes, d and i, of the yokes.

Before applying the yokes to the main springs, I attach the casing; the same being in one or the other of two forms, according to the position in which the device is to be used. In the instance depicted in Figs. 1 to 5, the casing comprises a cylindrical cup, 6, having a tightly fitted cover, 7. The cover contains slots, 8, 8, for the accommodation of the arms of the yokes and the cup is attached to the internal yoke by means of ears, 9, 9, which may extend through the slots, 8. To avoid separate fastenings, the ears are provided with holes, 10, to receive the shackle bolt, K, and thus that bolt is made to serve both as the spring connection for the smaller yoke and as the support or fastening for the casing. The ears are preferably wider than the slot, c, and normally conceal the same. In practice I partially fill the cup or casing with grease and thus provide for the lubrication of the parts.

The operation of the device is clearly shown in Figs. 2 and 3, from which it will be seen that the device as a whole constitutes an elastic shackle or coupling for the ends of the main springs, E and F. When an excessive load is imposed on the main spring the coiled spring, 5, is compressed between the yokes and as the load lessens said coil spring restores the yokes and the main spring ends to the normal positions shown in Fig. 2.

To adapt my device to a main spring of the kind shown in Figs. 8 and 10, I simply invert it and proportion the yokes to the dimensions and throw limits of the main structure. If the device may normally stand at an inclination to the axle, M, I make it as shown in Fig. 8, and if it is to be normally perpendicular to the axle, I modify the shape, as shown in Fig. 10.

The axle, M, carries the bracket, H, opposite the end of the main spring, G, and adjacent to the hub or drum, N. The shock absorber shown in Fig. 8, except that it is shorter, is identical with the device detailed above; whereas the device shown in Fig. 10 differs in two particulars, to-wit, the ends b of the long yoke are offset from the center plane to accommodate the changed position, and the smaller yoke is provided with a downwardly-bent flange, f', which forms a stop, to engage the bracket, H, and prevent outward throw of the upper end of the device. Fig. 11 shows the stamping or blank from which this modified internal yoke is made.

The casing 12 of the inverted shock absorber cannot well be made to hold a lubricant and is essentially a dust cap. I prefer that it shall be rectangular, and that it shall very snugly fit the external yoke to prevent rattling. Therefore, I form it from sheet metal, in square, box-like form, with ears, 9ª, that are simple extensions of the sides 12'. The folding in of the sides, as required to place the ears over the shackle, both causes the edge flanges 12" to engage and hold the other sides 12'''. The points between the sides need not be otherwise closed. The top 12'''' of the box is preferably integral with the sides.

The width of the yokes is determined by the width of the main springs to be received. As the coiled springs take their dimensions from that of the external yokes, it will be clear that the proportioning of the latter to the main springs automatically determines the size of the coiled springs. My device, though containing only a single spring, as contrasted with the known double spring absorbers is more certainly balanced and does not tend to either throw or wear out of the true perpendicular to the action plane of the main spring.

Having thus described my invention, I claim as new and desire to secure by Letters Patent.

1. An automobile shock absorber, comprising an external yoke, containing guide slots in the sides, in combination with an internal yoke having arms shorter than and slidable in said slots, a compression spring between the bottoms of said yokes, the ends of both yokes containing shackle bolt holes, and a casing inclosing the spring containing portion of said external yoke and having ears that contain bolt holes that register with those of the internal yoke for the purpose described.

2. An automobile shock absorber, comprising an external yoke, containing guide slots in the sides, in combination with an internal yoke having arms shorter than and slidable in said slots, a compression spring between the bottoms of said yokes, the ends of both yokes containing shackle bolt holes, and a lubricant casing inclosing the spring-containing portion of said external yoke and having slots in its top for the arms of said yokes and said casing having ears that contain bolt holes that register with those of the internal yoke for the purpose described.

3. In an automobile shock absorber a primary strap metal yoke comprising a bottom and integral opposed arms, the arms containing guide slots, in combination with a secondary yoke comprising a bottom and integral opposed arms, the arms of said secondary yoke being shorter than and slidable in said guide slots, a compression spring between the bottoms of said yokes, said primary strap metal yoke being formed to engage said compression spring circumferentially to center and firmly hold the spring, the arms of both yokes containing shackle bolt holes, and a separate casing inclosing the lower parts of both said yokes.

4. An automobile shock absorber, comprising a primary yoke containing guide slots in the sides, in combination with a secondary yoke having arms shorter than and slidable in said slots, a compression spring between the bottoms of said yokes the ends of both yokes containing shackle bolt holes, and casing means inclosing the spring-containing portion and having a part extending upwardly from the spring-inclosing part and adjacent the primary yoke arms, holes therein to accommodate the shackle bolt which passes through the secondary yoke, and said casing inclosing the lower parts of both said yokes.

5. An automobile shock absorber comprising a primary yoke, containing guide slots in its sides, in combination with a secondary yoke having arms shorter than and slidable in said slots, a compression spring between the bottoms of said yokes, the ends of both yokes containing shackle bolt holes, a separate casing inclosing the spring containing portions of both yokes and formed and adapted to move the said secondary yoke.

In testimony whereof, I have hereunto set my hand, this 23d day of November, 1914, in the presence of two subscribing witnesses.

SAMUEL M. STONE.

Witnesses:
ED. BAKER,
JOHN R. LEFEVRE.

Copies of this patent may be obtained for five cents each, by addressing the "Commissioner of Patents, Washington, D. C."